United States Patent
Andersson et al.

(10) Patent No.: US 9,050,732 B2
(45) Date of Patent: Jun. 9, 2015

(54) METHOD OF FORMING A CUTTING LINE PARTIALLY THROUGH A MULTILAYER PLATE STRUCTURE

(75) Inventors: Jonas Andersson, Kalmar (SE); Pierre Josefsson, Kalmar (SE)

(73) Assignee: Trelleborg Sealing Solutions Kalmar AB, Kalmar (SE)

( * ) Notice: Subject to any disclaimer, the term of this patent is extended or adjusted under 35 U.S.C. 154(b) by 1021 days.

(21) Appl. No.: 13/139,791

(22) PCT Filed: Dec. 23, 2009

(86) PCT No.: PCT/SE2009/051498
§ 371 (c)(1),
(2), (4) Date: Nov. 28, 2011

(87) PCT Pub. No.: WO2010/074650
PCT Pub. Date: Jul. 1, 2010

(65) Prior Publication Data
US 2012/0064301 A1  Mar. 15, 2012

(30) Foreign Application Priority Data

Dec. 23, 2008  (SE) ........................................ 0850183

(51) Int. Cl.
*B32B 38/04* (2006.01)
*B26D 3/08* (2006.01)
(Continued)

(52) U.S. Cl.
CPC ............ *B26D 3/08* (2013.01); *Y10T 428/24612* (2015.01); *B32B 38/185* (2013.01); *B32B 38/0004* (2013.01); *B21D 28/10* (2013.01); *B26D 7/025* (2013.01); *B32B 3/14* (2013.01); *B32B 3/266* (2013.01); *B32B 7/02* (2013.01);
(Continued)

(58) Field of Classification Search
CPC ...... B32B 38/04; B32B 2038/04; B26D 3/08; B26D 7/015; B26D 7/02
USPC .......... 428/167, 172; 156/211, 250, 257, 268, 156/270; 123/192.1, 198 E
See application file for complete search history.

(56) References Cited

U.S. PATENT DOCUMENTS 3,555,950 A *  1/1971  Gijsbers et al. ................. 83/171
5,143,790 A *  9/1992  Sattinger ....................... 428/457
(Continued)

FOREIGN PATENT DOCUMENTS

EP    0065179 A2    11/1982
EP    0794041 A1    9/1997
(Continued)

OTHER PUBLICATIONS

Machine translation of EP 0794041, Sep. 1997.*
International Search Report issued Apr. 13, 2010 for corresponding International Patent Application No. PCT/SE2009/051498 (4 pages).

*Primary Examiner* — Donald J Loney
(74) *Attorney, Agent, or Firm* — Pierce Atwood LLP; Kevin M. Farrell; Daniel A. Lev

(57) ABSTRACT

A cutting line partially through a multilayer plate structure (1) comprising at least one rigid layer (6, 7) attached to a non-rigid layer (5) is formed by punching in one operation a cutting edge (15) through at least the rigid layer (6) the leaving at least one layer (7) of the multilayer plate structure (1) uncut. During the cutting operation, the rigid layer is gripped by lateral position retaining means (16) to prevent lateral movement of the rigid layer.

12 Claims, 4 Drawing Sheets

(51) Int. Cl.
*B21D 28/10* (2006.01)
*B26D 7/02* (2006.01)
*B32B 3/14* (2006.01)
*B32B 3/26* (2006.01)
*B32B 7/02* (2006.01)
*B32B 15/06* (2006.01)
*B32B 15/18* (2006.01)
*B32B 38/18* (2006.01)
*B32B 38/00* (2006.01)

(52) U.S. Cl.
CPC .............. *B32B 15/06* (2013.01); *B32B 15/18* (2013.01); *B32B 2250/03* (2013.01); *B32B 2250/40* (2013.01); *B32B 2307/56* (2013.01); *B32B 2605/08* (2013.01)

(56) References Cited

U.S. PATENT DOCUMENTS

| | | | | |
|---|---|---|---|---|
| 5,691,037 A | * | 11/1997 | McCutcheon et al. | 428/172 |
| 6,279,446 B1 | * | 8/2001 | Halket et al. | 83/879 |
| 8,701,624 B2 | * | 4/2014 | Andersson et al. | 123/198 E |

FOREIGN PATENT DOCUMENTS

| | | |
|---|---|---|
| EP | 1956223 A1 | 8/2008 |
| JP | S6195933 A | 5/1986 |
| JP | S61211549 A | 9/1986 |
| JP | H06340024 A | 12/1994 |
| JP | 11257437 A | 9/1999 |
| JP | 2000299563 A | 10/2000 |

* cited by examiner

METHOD OF FORMING A CUTTING LINE PARTIALLY THROUGH A MULTILAYER PLATE STRUCTURE

FIELD OF THE INVENTION

The present invention relates to a method of forming a cutting line partially through a plate structure, and more particularly through a vibration damping multilayer plate structure.

BACKGROUND OF THE INVENTION

In Wiman, U., Automotive Engineering 16 (2008):10, p. 34, 36, "Shear plate reduces diesel engine noise", there is disclosed a vibration damping plate for mounting between the engine block and the oil pan below the crankshaft in an internal-combustion engine. The damping plate, referred to as a "shear plate", consists of a sandwich laminate including a middle rubber layer vulcanized together with two steel layers. The shear plate has milled grooves in the steel layers held together by the middle rubber layer. When the upper steel layer is fastened to one side of the engine block, and the lower layer is fastened to the other, it permits shearing, and thus, damping, in the middle layer.

An improvement of this approach is described in our co-pending international application entitled "Vibration damped article", where the damping plate is mounted to opposed sidewalls of the oil pan rather than between the engine block and the oil pan, and where each metal layer has a cut or groove through the metal layer, and preferably also through at least part of the middle elastomer layer, thereby removing the direct vibration transmission paths through the metal layers from the metal/elastomer layer portion attached to one side wall of the oil pan to that attached to the other sidewall.

Milling such cuts or grooves in the damping plate steel layers is, however, a rather complicated and costly procedure, and a more convenient and simpler method would be desired. It is the object of the present invention to provide such a method.

SUMMARY OF THE INVENTION

According to the present invention, a partial cut of narrow or minimal width through a multilayer laminate structure comprising a non-rigid layer attached to a rigid layer (for example a non-rigid layer sandwiched between two rigid layers) such that the cut extends through the rigid layer is accomplished by a punching-type procedure. Optionally, the cut extends also through one or more underlying non-rigid and rigid layers, respectively, even up to, but not through, an outermost rigid layer, if desired.

According to a salient feature of the invention, measures are taken to at least substantially prevent lateral displacement and curling of the rigid layer on either side of the cutting edge in relation to the non-rigid layer during the cutting operation. Thereby, any such lateral displacement with associated layer surface deformation may be restricted to the surface areas in the immediate vicinity of the cutting line.

Such a method comprises the steps of:
a) placing the multilayer plate structure on a rigid support,
b) positioning a cutting edge towards the multilayer plate structure,
c) advancing the cutting edge towards a rigid layer,
d) placing lateral position retaining means in contact with the rigid layer surface on either side of the cutting edge,
e) cutting through at least the rigid layer but leaving at least one layer of the multilayer plate structure uncut, and holding the rigid layer by the lateral position retaining means to prevent lateral movement of the portion of the rigid layer between the rigid layer and the lateral position retaining means during the cutting operation.

Preferred embodiments are set forth in the dependent claims.

The invention also relates to a multilayer plate structure produced by the method, to the use of the method for producing a vibration damping plate, and to the use of such a vibration damping plate in an automotive vehicle.

Other objects, advantages and novel features of the invention will become apparent from the following detailed description of the invention when considered in conjunction with the accompanying drawings and claims.

In the following, the invention will be described, by way of example only, by some non-limiting embodiments of the invention.

DETAILED DESCRIPTION OF THE INVENTION

As mentioned above, the present invention is directed to a method for cutting through an outer rigid layer, and optionally also through one or more underlying non-rigid and rigid layer layers, respectively, of a multilayer laminate plate structure. An example of such a laminate plate structure is a vibration damping plate that includes an elastomer layer sandwiched between two metal sheets.

Cutting is an important working process in workshop practice where a sheet or rod is severed by shearing, cracking and finally breaking. A common cutting method is punching, as is used for example for cutting circular holes in a sheet metal. A simple punching tool consists of a punch and a die. The sheet metal is placed on the die, whereupon the punch acts upon the sheet metal with a certain force and the severance takes place, the sheet first being deformed by bending and then by shearing to finally crack and break when the point is reached at which the material can not be plastically deformed any further.

Figure 1:
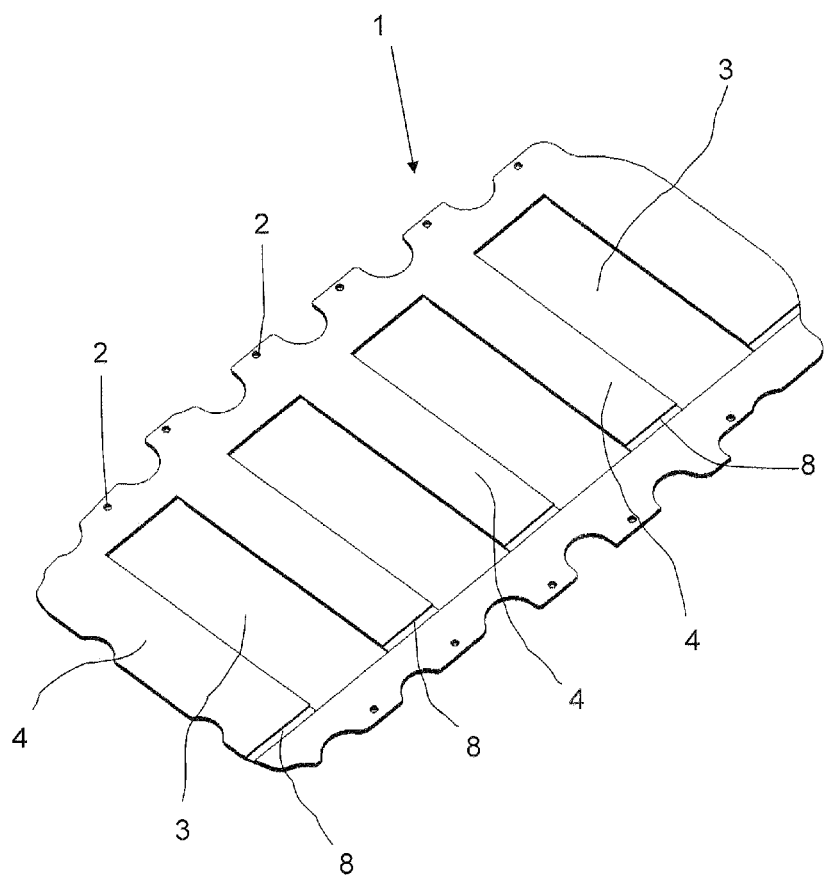
FIG. 1 is a schematic perspective top view of a vibration damping multilayer plate.
Figure 2:
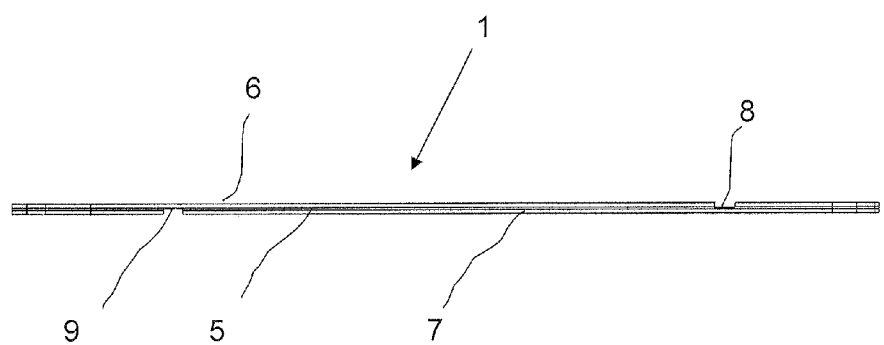
FIG. 2 is a cross-sectional view of the damping plate in FIG. 1.

An example of a sandwich plate structure of the above-mentioned type, here specifically designed for damping of vibrations in an oil pan mounted to a combustion engine block, is illustrated in FIGS. 1 and 2, and is described in more detail in our co-pending international application entitled "Vibration damped article" (the entire disclosure of which is incorporated by reference herein), which claims priority from Swedish application no. 0850184-3.

The damping plate, generally designated by reference numeral 1, is designed to be attached to two opposed sidewalls of the oil pan (not shown) via a plurality of brackets positioned along the sidewalls of the oil pan some distance below its mounting surface to the engine block. To this end, the damping plate 1 is, in the illustrated case, provided with a number of apertures 2, each of which can receive an extending pin on each sidewall bracket (not shown). Other fastening means, such as screws or rivets, for instance, may of course, be used instead. The damping plate 1 is further provided with openings 3 for permitting rotation of the crankshaft when the oil pan is mounted to an engine block. The openings 3 delimit a number of connecting members 4 which connect one edge portion of the damping plate 1 with the opposite edge portion.

As can be seen from FIG. 2, the illustrated damping plate 1 is a sandwich laminate structure comprising a middle layer 5 of a non-rigid material, typically an elastomer, and upper and lower constraining layers 6, 7 of a rigid material, typically metal (or metal alloy). An exemplary damping plate consists of a rubber layer attached or bonded (e.g. vulcanized) between two steel sheets. Referring also to FIG. 1 again, in each connecting member 4 there is cut a cut line or groove 8 through the upper metal layer 6 and the middle elastomer layer 5 at least substantially up to the lower metal layer 7. Corresponding grooves 9 (FIG. 2) are cut in the lower metal layer 7, however, disposed at the opposite longitudinal edge portion of the damping plate 1.

Such provision of grooves 8, 9 thus divides each metal layer 6, 7, and optionally also the intermediate elastomer layer 5, into two separate (discontinuous) parts, i.e. a first part extending from one attachment side edge of the plate 1 up to the grooves, and a second part extending from the grooves up to the edge of the opposite attachment side of the damping plate, each metal/elastomer layer part being supported by the other metal layer. This division of each metal layer, and optionally the elastomer layer, into two separate parts supported by the other rigid layer will substantially reduce the rigidity of the damping plate and provide for efficient damping of vibrations. It is, however, not necessary that grooves 8, 9 are cut in each connecting member 4. For example, the grooves may be omitted in the outermost connecting member on each side of the damping plate.

The cuts 8, 9 in the metal layers 6, 7 may be made by conventional cutting methods like, for example, milling or sawing, which are based on removal of sheet material.

According to the present invention, however, narrow grooves 8, 9 are made without removal of sheet material by selectively punching through the respective metal layers 6, 7 and optionally into or through the elastomer layer, as will be described more generally below with reference to FIGS. 3, 4 and 5. It must be noted that in the following terms such as "vertical", "upper" and "lower" are used merely with reference to the geometry of the embodiment of the invention shown in the figures and are not intended to limit the invention in any manner.

Figure 3:
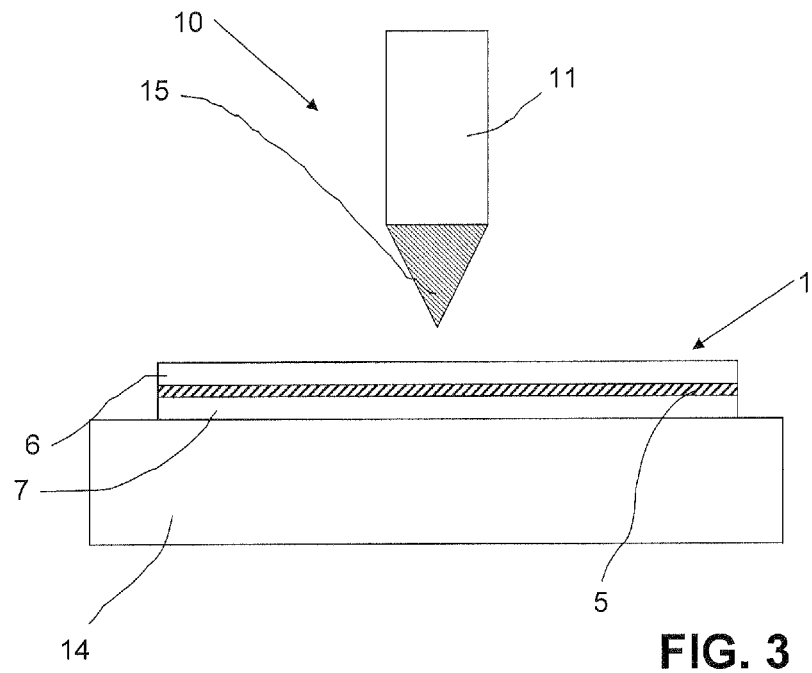
FIG. 3 is a schematic cross-sectional view of an embodiment of a punching tool ready for cutting a groove in a vibration damping plate according to a first embodiment of the method of the present invention.

FIG. 3 schematically depicts a punching tool, generally designated by reference numeral 10, comprising an elongate punch 11 mounted (not shown) for vertical movement, and a die 14 with a planar top surface. The punch includes a cutting edge 15, which is shown here as being V-shaped. A multilayer vibration damping plate 1 is placed on the die 14. Merely for the purposes of illustration of the invention, the damping plate 1 is of the type described above which includes upper and lower metal sheets 6, 7 and an intermediate elastomer layer 5 (the same reference numerals as in FIGS. 1 and 2 are used). In FIG. 3, the punch 11 is in a position above the damping plate 1 placed on the die 14.

Figure 4:
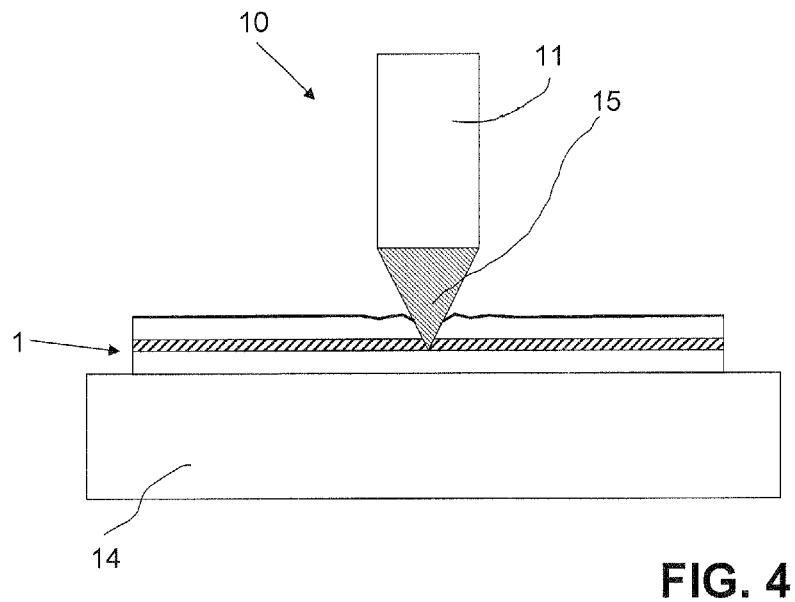
FIG. 4 is a schematic cross-sectional view corresponding to that in FIG. 3 but where the cutting edge of the punching tool has selectively cut through the top rigid layer and the middle non-rigid layer of the damping plate.

For clarity, the punching tool and damping plate illustrated in FIGS. 3 and 4 (as well as the punch depicted in FIG. 5) are not drawn to scale and are not in proportion.

FIG. 4 shows the punch 11 forced downwards in one operation such that the cutting edge 15 thereof has cut through the upper metal sheet 6 and the middle elastomer layer 5 down to the lower metal sheet 7 which may be touched as shown here or alternatively may be partially penetrated but which is not cut through in this operation.

For cutting the grooves 8, 9 in the damping plate 1, the cutting edge 15 of the punch 11 should have a length of at least the longitudinal extension of the damping plate as shown in FIG. 1. The separate grooves 8 (as well as the separate grooves 9) may be seen as forming a single cutting line together with the openings 3. Alternatively, the punch could have a plurality of spaced cutting edges corresponding to the separate grooves in the damping plate shown in FIG. 1. In still another alternative, the grooves 8 may be cut in separate cutting operations by a cutting edge of corresponding length.

Placing the laminate plate between the punch 11 and the die 14, as described above and shown in FIGS. 3 and 4, may, however, result in the upper metal layer on each side of the cutting edge being displaced laterally from the cutting line during the cutting operation since, as mentioned, no sheet material is removed—it is just displaced. This may in turn cause the metal sheet to curl or warp as well as risk displacing the fastening apertures 2 of the damping plate 1, if the latter are made before the cutting operation.

The metal sheet is therefore gripped, preferably immobilized, by appropriate lateral position retaining means on each side of the cutting edge of the punch to prevent lateral movement of the sheet portions during the cutting operation. This is illustrated in FIGS. 6 and 7, where corresponding parts have the same reference numerals as in FIGS. 3 and 4.

Figure 6:
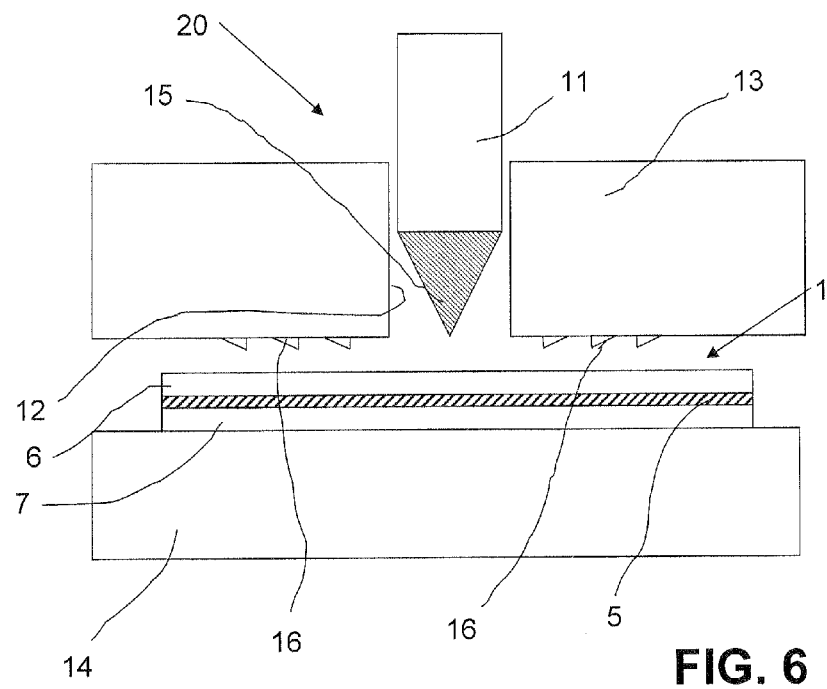
FIG. 6 is a schematic cross-sectional view of another embodiment of punching tool ready for cutting a groove in a vibration damping plate according to a second embodiment of the method of the present invention.
Figure 7:
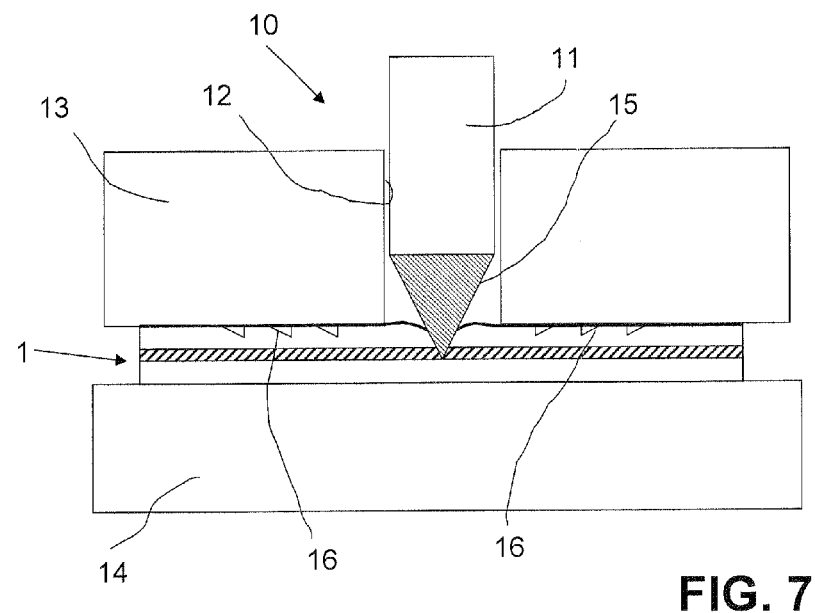
FIG. 7 is a schematic cross-sectional view corresponding to that in FIG. 6 but where the cutting edge of the punching tool has selectively cut through the top rigid layer and the middle non-rigid layer of the damping plate.

The punching tool shown in FIGS. 6 and 7, which is generally designated by reference numeral 20, differs from that in FIGS. 3 and 4 in that the punch 11 with cutting edge 15 is slidably mounted in a recess 12 of rectangular cross-section of a support 13. In FIG. 6, the punch 11 and the support 13 are in a position above the damping plate 1 placed on die 14.

The underside of the support 13 is provided with a number of gripping features, here barb-like ridges 16, extending in lines parallel to the cutting edge 15. When the damping plate is clamped against the die 14 by lowering the support 13, the ridges 16 are intended to cut into, and thereby grip, the topmost layer of the upper metal sheet 6 (FIG. 7). Various alternative gripping features, such as e.g. other pointed protrusions, as well as the pattern of their arrangement on the underside of the support 13, are readily apparent to the skilled person.

Figure 5:
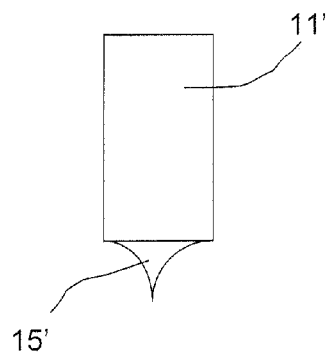
FIG. 5 is a schematic cross-sectional view of a punch with an alternative design of the cutting edge.

Similarly as in FIGS. 4 to 5, for clarity, the different parts are not to scale and are not in proportion.

FIG. 7 shows the punch 11 forced downwards in one operation such that the cutting edge 15 thereof has cut through the upper sheet 6 and the middle elastomer layer 5 down to the lower metal sheet 7 which may be touched as shown here or alternatively may be partially penetrated but which is not cut through in this operation.

During the cutting operation, the ridges 16 on support 13 effectively lock the upper sheet 6 material on either side of the cutting edge 15 against lateral displacement, resulting in a narrow cut of minimal width and with substantially no curling, warping or the like of the sheet surface.

As can be seen in FIG. 7, it is only the sheet material surface in the immediate vicinity of, i.e. immediately adjacent to, the cutting line that is slightly deformed when the cutting edge 5 forces the sheet material laterally.

The term "immediate vicinity" in the present context is to be interpreted in a relatively broad sense, the sheet areas subject to plastic deformation depending inter alia on the extension of the bottom parts of support 13 towards the cutting edge on each side thereof. The distance, or spacing, between the support and the cutting edge is selected depending on the thickness and hardness of the sheet material to be cut. If the distance is too great, the cut material parts will not undergo any significant plastic deformation and the edges of the cut line will spring back with substantially no remaining deformation, i.e. no or a very thin cut line will be obtained. Too short a distance, on the other hand, may not leave enough room for the plastically-deformed material to flow into and may cause damage to the cutting edge.

For example, a vibration damping plate to be used in a conventional type internal combustion engine typically has a cutting line width at the top of the V-shaped cut (resulting from the V-shaped cutting edge) of the same order as, or less than, the depth of the cut e.g. 3 mm or less for a 3 mm thick plate. The width at the bottom of the cut should be greater than 0 mm so that the two sides of the split are close to each other but not in contact with each other, and is in practice often greater than 0.1 mm.

For such a cut, it has been found that with, for example, sheet steel of 1 mm thickness and moderate hardness, a distance from the cutting edge to the support on either side thereof of 8 mm will give a satisfactory result as there is sufficient plastic deformation to result in the desired cut width, whereas a distance of 20 mm gives an unsatisfactory result as there is no plastic deformation and the cut metal springs back into place.

The grooves 9 on the bottom metal sheet 7 of the damping plate 1 can be cut in a corresponding manner.

While the cutting edge 15 in FIGS. 3 and 4 is V-shaped with planar side faces, an alternative cutting edge design is shown in FIG. 5, where the cutting edge 15' of the punch 11' has side faces that are concave rather than V-shaped which reduces the amount of material that is displaced during the cutting operation and further reduces any tendency for curling, warping or the like.

Also, while the cutting of a groove in the form of a straight line has been described above, grooves having various alternative designs may be cut with a correspondingly designed cutting edge or edges, such as e.g. curved or wave- or zigzag-shaped, or a closed shape such as circular, elliptic, square or other polygonal shape.

Cutting a groove across a multilayer plate structure, such as the type described above, may also be used to facilitate bending of the plate structure along the groove. In the event that a V-shaped cutting edge is used, then if it is intended that the punched material is to be bent along the cut line then the angle of the V can be adapted to the angle that the material is intended to be bent though. For example if the material is to be bent through 90° then the angle of the V should preferably also be 90°.

The above described approach to cutting grooves in a sandwich damping plate may, of course, be applied to a variety of other situations where it is desired to make a partial cut through at least through a top rigid layer in multi-layer plate structures of various types, for example structures including more than two rigid layers with intermediate non-rigid layers.

The present invention is not limited to the above-described preferred embodiments. Various alternatives, modifications and equivalents may be used. Therefore, the above embodiments should not be taken as limiting the scope of the invention, which is defined by the appending claims.

The invention claimed is:

1. A method of forming a cutting line partially through a multilayer plate structure comprising at least one rigid layer attached to a non-rigid layer, comprising the steps of:
   a) placing the multilayer plate structure on a rigid support,
   b) positioning a cutting edge towards the multilayer plate structure,
   c) advancing the cutting edge towards a rigid layer,
   d) placing lateral position retaining means in contact with the rigid layer surface on each side of the cutting edge, and
   e) cutting through at least the rigid layer but leaving at least one layer of the multilayer plate structure uncut, and holding the rigid layer by the lateral position retaining means to prevent lateral movement of the portion of the rigid layer between the cutting edge and the lateral position retaining means during the cutting operation.

2. The method according to claim 1, wherein the cutting in step e) is performed in a single operation.

3. The method according to claim 1, wherein deformation of the rigid layer surface caused by lateral movement of the rigid layer is at least substantially restricted to rigid layer areas in immediate vicinity of the cutting line.

4. The method according to claim 1 wherein the lateral position retaining means is designed to immobilize the rigid layer on either side of the cutting edge.

5. The method according to claim 4, wherein the cutting edge is part of a cutting element slidably mounted in a support having a planar bottom surface with protruding gripping means, and wherein gripping of the rigid layer is effected when the support is pressed against the multilayer plate structure.

6. The method according to claim 5, wherein the cutting element comprises a punch.

7. The method according to claim 1, further comprising cutting a single cutting line across the multilayer plate structure.

8. The method according to claim 1, further comprising cutting several separate cutting lines across the multilayer plate structure.

9. The method according to claim 1, wherein the multilayer plate structure comprises a non-rigid layer sandwiched between two rigid layers.

10. The method according to claim 9, further comprising cutting one or more cutting lines on each face of the multilayer plate structure.

11. The method according to claim 9, wherein the non-rigid layer is an elastomer, and the rigid layers are metal sheets.

12. The method according to claim 11, wherein the metal sheets are steel or aluminium sheets and the elastomer layer is rubber attached to the steel or aluminium sheets.

* * * * *